No. 680,602. Patented Aug. 13, 1901.
C. A. LIEB.
MOTOR VEHICLE.
(Application filed May 23, 1900.)
(No Model.)
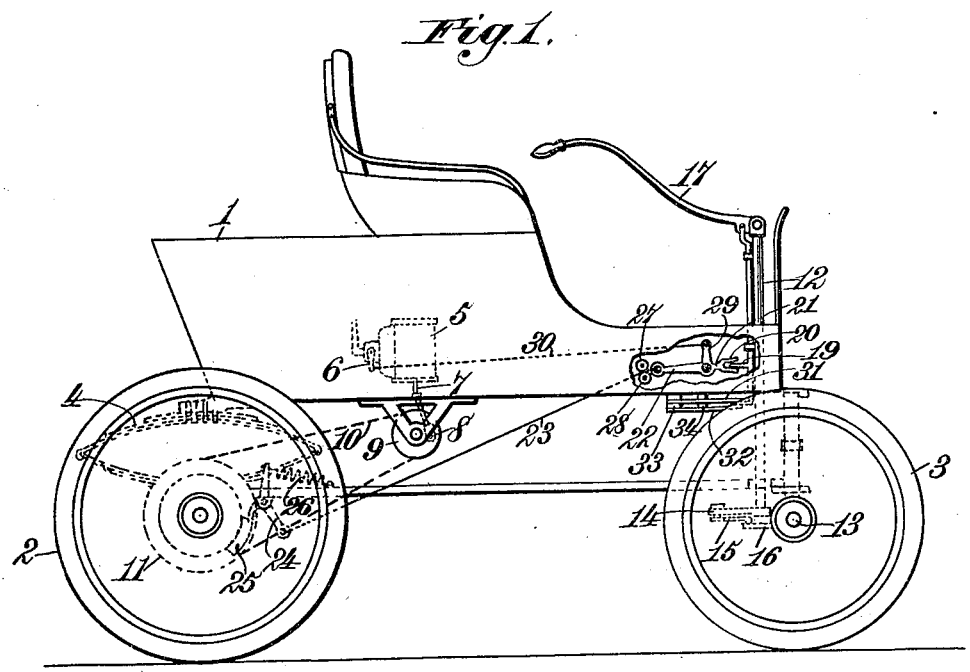
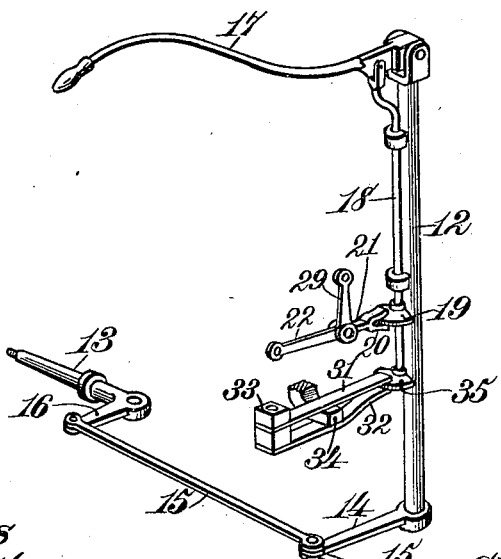
Witnesses
Robert Everett
Inventor,
Charles A. Lieb.
By James L. Norris
Atty.

UNITED STATES PATENT OFFICE.

CHARLES A. LIEB, OF NEW YORK, N. Y.

MOTOR-VEHICLE.

SPECIFICATION forming part of Letters Patent No. 680,602, dated August 13, 1901.

Application filed May 23, 1900. Serial No. 17,711. (No model.)

*To all whom it may concern:*

Be it known that I, CHARLES A. LIEB, a citizen of the United States, residing at New York, in the county of New York and State of New York, have invented new and useful Improvements in Motor-Vehicles, of which the following is a specification.

My invention relates to motor-vehicles, the object of the same being to provide means whereby the starting, stopping, and reversing of the motor, the braking of the vehicle, and the steering of the same are put under the control of a single lever.

A further object of the invention is to provide means whereby the motor or other propelling means is automatically cut off and the brake applied as soon as the pressure upon the operating-lever is removed.

Other objects and advantages of the invention will hereinafter appear, and the novel features thereof will be defined in the claims.

In the drawings forming part of this specification, Figure 1 is an elevation, partly broken away, of a motor-vehicle embodying my improvements. Fig. 2 is a detail perspective view showing the steering-post, the connections between the same and the front axles of the vehicle, the operating-lever, and the connections between the same and the motor and brake.

Like reference-numerals indicate like parts in the two views.

One means of carrying out my invention is illustrated in detail in the drawings; but I do not confine myself to the specific features of construction shown, but reserve the right to change, vary, or modify the same at will within the scope of the appended claims.

The body 1, rear driving-wheels 2, and front steering-wheels 3, with the supporting-springs 4 for the body, may all be of any suitable form and construction. The motor 5, which is preferably but not necessarily mounted upon the body, may be a steam-engine, gas-engine, electric motor, or any other form of motor. I have shown the same as a steam-engine with the crank-arm 6 connected with the controlling-valve thereof. Said engine is also shown connected through the piston-rod 7, wrist-pin 8, pulley or gear-wheel 9, chain or belt 10, and pulley or gear-wheel 11 with the rear driving-wheels 2, so that the power of said engine may be transmitted to said driving-wheels.

The steering-post 12 is shown as vertically disposed at the forward end of the vehicle, and the same is connected with the axles 13, on which the front steering-wheels 3 are mounted, through a crank-arm 14, pitmen 15, and crank-arms 16. Upon the upper end of the steering-post 12 is pivoted the operating-lever 17. By this construction it will be observed that by moving the operating-lever 17 to the right or left a corresponding movement will be transmitted, through the means described, to the axles on which the wheels 3 are mounted for the purpose of steering the vehicle. Pivoted to the operating-lever 17 and extending along the steering-post 12 is a slidingly-mounted rod or bar 18, having a rearwardly-extending horizontal segmental lug or plate 19 secured thereto. The said lug or plate 19 lies and is adapted to move between the branches of a fork 20 in the forward end of one arm of a lever 21, the said lever being fulcrumed upon a stationary part of the vehicle. The opposite arm 22 of said lever is connected, through the flexible cord or chain 23, with an arm 24 on a brake 25, normally held in engagement with a disk on the driving-wheel 2 or the axle thereof by a spring 26. Adjacent to the arm 22 of the lever 21 the flexible cord or chain 23 passes between two guide-rollers 27 28, so that when the lever 21 is rocked in either direction from is normal position it will serve to draw the brake 25 away from the disk with which it coöperates. The lever 21 is further provided with a crank-arm 29, which is connected through a rod or pitman 30 with the crank-arm 6 on the end of the controlling-valve of the motor 5. The said controlling-valve is so disposed normally, as shown in Fig. 1 of the drawings, as to cut out the motor 5. When the crank-arm 6, however, is moved rearwardly, the controlling-valve is so operated as to start the motor 5 forwardly, and when the crank-arm 6 is moved forwardly the controlling-valve is so turned as to reverse the motor 5. It will be observed, therefore, that when the free end of the operating-lever 17 is elevated the lever 21 will be rocked through the engagement of the lug 19 with the fork 20 in one arm thereof, depress the opposite arm 22 thereof, and throw the crank-arm 29 thereof rearwardly, transmitting corresponding movements to the brake 25 and to the crank-arm 6 on the controlling-valve. The result is that the brake 25 is moved away from the disk with which it coöperates against the action of the spring 26, and the motor 5 is started and serves to propel the vehicle forward. If, however, the operating-lever 17 be depressed, the brake 25 is also removed from the disk with which it coöperates, the crank-arm 6 on the controlling-valve is moved in the opposite direction, and the motor is reversed.

The means provided by me for maintaining the controlling-valve in its normal position, as shown in Fig. 1 of the drawings, with the motor 5 cut out and the brake 25 on, consists of a pair of leaf-springs 31 32, secured at 33 to a stationary part of the vehicle and having a separating-block 34 between them. Between the free ends of said springs 31 32 is disposed a rearwardly-extending horizontal segmental lug or plate 35, secured to the rod or bar 18. The spring 31 serves to resist the upward movement of the rod or bar 18 by the engagement of the lug 35 with the under side thereof, and the spring 32 serves to resist the downward movement of said rod or bar by the engagement of the lug 35 with the upper side thereof. Both of said springs, therefore, act together to hold the operating-lever 17, the rod or bar 18, and the controlling-valve for the motor 5, which is connected through the means described with said operating-lever and rod or bar in their normal positions, at which time the brake 25 is applied through the action of the spring 26. The result of the construction described is that as soon as the pressure in one direction on the operating-lever 17 is relieved the motor 5 is automatically cut off, the brake 25 applied, and the movement of the vehicle automatically stopped. All operations of the motor 5, including the starting, stopping, and reversing of the same, together with the braking and steering of the vehicle, are also under the control of a single operating-lever 17.

Having now described my invention, what I claim as new, and desire to secure by Letters Patent, is—

1. In a motor-vehicle, steering mechanism, a brake, and means controlled by said mechanism, and acting directly upon the motor for starting, stopping and reversing the same and for throwing said brake into and out of operation.

2. In a motor-vehicle, a steering-lever, a brake, and means controlled by said lever and acting directly on the motor for starting, stopping and reversing the same and for throwing said brake into and out of operation.

3. In a motor-vehicle, a steering-lever, a normally-applied brake, means controlled by said lever and acting directly on the motor for starting, stopping and reversing the same, and means controlled by said lever for releasing the brake when the motor is started in one direction or the other.

4. In a motor-vehicle, a brake, a rotary steering-post, an operating-lever pivoted thereto, a rod or bar pivoted to said lever and adapted to be actuated thereby, a controlling-valve for the motor, and connections between said brake and controlling-valve and said rod or bar, whereby said brake and controlling-valve are actuated by the movement of said rod or bar.

5. In a motor-vehicle, a rotary steering-post, an operating-lever pivoted thereto, a rod or bar pivoted to said lever and adapted to be actuated thereby, a segmental lug or plate on said rod, a crank-arm connected to the controlling-valve of said motor, a lever having a crank-arm thereon, and a rod connecting the crank-arm on said lever with the crank-arm on said valve, the said lever being provided with a yoke or fork between the branches of which said lug or plate is located.

6. In a motor-vehicle, steering mechanism, means controlled by said mechanism and acting directly upon the motor for starting, stopping and reversing the same, a brake, and means for automatically stopping said motor and applying said brake when pressure upon said steering mechanism is relieved.

7. In a motor-vehicle, a steering-lever, means controlled by said lever and acting directly upon the motor for starting, stopping and reversing the same, a brake, and means for automatically stopping said motor and applying said brake when pressure upon said steering-lever is relieved.

8. In a motor-vehicle, a steering-lever, means controlled by said lever and acting directly upon the motor for starting, stopping and reversing the same, and a spring for automatically stopping said motor when pressure upon said steering-lever is relieved.

9. In a motor-vehicle, a steering-lever, means controlled by said lever and acting directly upon the motor for starting, stopping and reversing the same, a brake, and springs for automatically stopping said motor and applying said brake when pressure upon said steering-lever is relieved.

10. In a motor-vehicle, a pivotally-mounted operating-lever for the motor, and a pair of springs acting upon said lever for resisting its movements in opposite directions and automatically throwing said motor out of operation when pressure upon said operating-lever is relieved.

11. In a motor-vehicle, a pivotally-mounted operating-lever for the motor, a brake, a spring for normally maintaining said brake in operative position, and a pair of springs acting upon said lever for resisting its movements in opposite directions and automatically throwing said motor out of operation and permitting said brake to be applied when pressure upon said operating-lever is relieved.

12. In a motor-vehicle, a pivotally-mounted operating-lever for the motor, a rod or bar connected thereto and adapted to be actuated thereby, a lug on said rod or bar, a pair of springs acting upon opposite sides of said lug, and connections between said rod or bar and the controlling-valve of the motor, whereby said motor is automatically thrown out of operation when pressure upon said operating-lever is relieved.

13. In a motor-vehicle, a pivotally-mounted operating-lever for the motor, a rod or bar connected thereto and adapted to be actuated thereby, a lug on said rod or bar, a brake, a spring for normally maintaining said brake in operative position, a pair of springs acting upon opposite sides of said lug, connections between said rod or bar and the controlling-valve of the motor, and connections between said rod or bar and said brake, whereby said motor is automatically thrown out of operation and said brake is applied when pressure upon said operating-lever is relieved.

In testimony whereof I have hereunto set my hand in presence of two subscribing witnesses.

CHARLES A. LIEB.

Witnesses:
 WM. M. STOCKBRIDGE,
 DENIS J. DOWNING.